United States Patent [19]
Cloutier

[11] 4,140,340
[45] Feb. 20, 1979

[54] WATERMELON TRAY
[76] Inventor: Theodore Cloutier, 123 Main St., Claremont, N.H. 03743
[21] Appl. No.: 830,678
[22] Filed: Sep. 6, 1977
[51] Int. Cl.² .............................................. B23Q 3/00
[52] U.S. Cl. .................................................. 269/295
[58] Field of Search .................. 211/71, 41; 269/15, 269/327, 302.1, 295, 296, 289; 99/419, 425, 445

[56] References Cited
U.S. PATENT DOCUMENTS

| | | | |
|---|---|---|---|
| 227,012 | 4/1880 | Hoyt | 269/15 |
| 1,954,080 | 4/1934 | Kahn | 99/425 |
| 3,027,041 | 3/1962 | Stansbury et al. | 211/41 |
| 3,385,357 | 5/1968 | Burg | 99/425 |
| 3,442,395 | 5/1969 | Taylor | 211/41 |
| 3,659,585 | 5/1972 | Bay | 99/425 |

*Primary Examiner*—Robert C. Watson

[57] ABSTRACT

A tray for use in slicing a watermelon includes a concave, ovate portion with a handle at each end and a rib structure that provides V-shaped supports operable to hold a watermelon above the tray against rolling with its long axis lengthwise thereof. The rib structure also facilitates the slicing of the watermelon into servings of appropriate size and ensures juice drainage into the central area of the tray.

6 Claims, 4 Drawing Figures

WATERMELON TRAY

BACKGROUND REFERENCE

U.S. Pat. No. 3,436,231.

BACKGROUND OF THE INVENTION

Watermelons are popular fruit but because of their size and weight, they are not easily cut into servings of desired sizes.

Depending on the circumstances, a watermelon may be first cut in two, transversely of its long axis, particularly if less than the whole is to be consumed at one occasion. It may be cut transversely into slices which are then cut into servings of appropriate size or a watermelon may be cut lengthwise and the resulting sections then sliced into the wanted servings.

In any case, the hard rind of and the tendency of a watermelon to roll transversely of its long axis makes it difficult to hold the watermelon against rolling while making the required slices without the knife engaging the surface on which the watermelon is supported and without the escaping juice creating a messy condition and as far as I am aware, no means are available to facilitate the support of a watermelon while it is being cut into servings.

THE PRESENT INVENTION

The general objective of the present invention is to provide a tray that will facilitate the slicing of a watermelon, an objective attained with an elongated tray having a rib structure providing a V-shaped support or cradle for holding a watermelon of any length against rolling with its long axis extending lengthwise of the tray and the watermelon above the tray enabling it to be cut without engaging the tray, the underlying portion of the tray providing planar support for the tray extending substantially throughout its length and maintaining the tray steady while the watermelon is being sliced.

Another objective of the invention is to provide that the rib structure includes two lengthwise series of transverse ribs, corresponding ribs of the two series transversely aligned and with their proximate ends spaced apart to provide a lengthwise channel to accommodate the edge of a knife when slicing a watermelon lengthwise.

Another objective of the invention is to prevent juice flowing during the slicing of a watermelon from creating a messy condition, an objective attained with the tray concave and with the ribs arranged in two series to provide a central lengthwise channel thus permitting released juices to flow into the central portion of the tray.

Another objective of the invention is to arrange the rib structure in two groups that are so spaced as to provide a central support for an end of a watermelon or for a melon that is more nearly spherical.

Yet another objective of the invention is to provide a molded plastic tray, an objective attained by providing a tray having an ovate, concavo-convex, central portion and handle establishing portions, the rib structure on the concave surface of the ovate portion, and a marginal wall surrounding the convex surface thereof and dimensioned to provide a planar support for the ovate portion.

BRIEF DESCRIPTION OF THE DRAWINGS

A preferred embodiment of the invention is illustrated by the drawings of which

THE PREFERRED EMBODIMENT OF THE INVENTION

Figure 1:
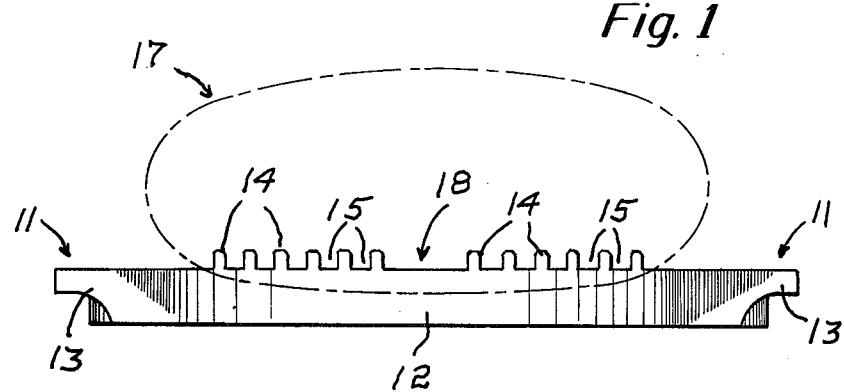
FIG. 1 is a side view of a tray in accordance with the invention.
Figure 2:
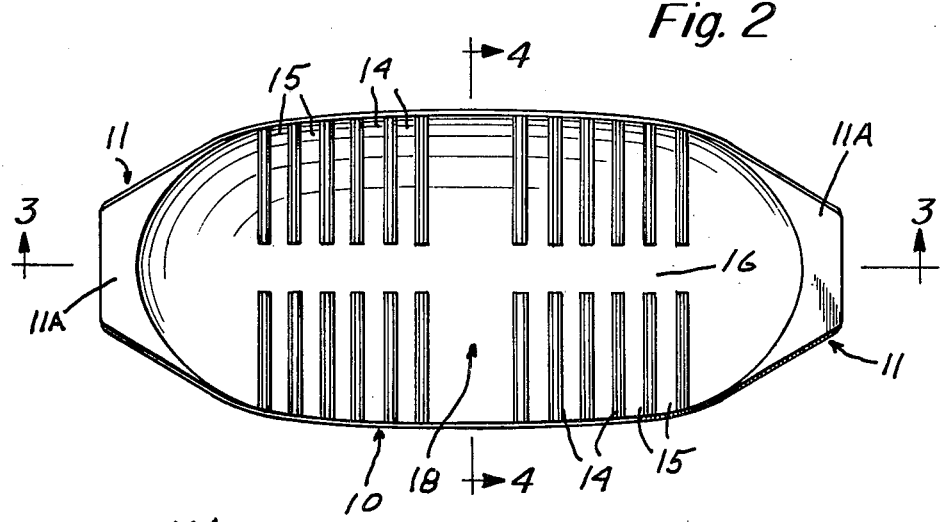
FIG. 2 is a top plan view thereof.
Figure 3:
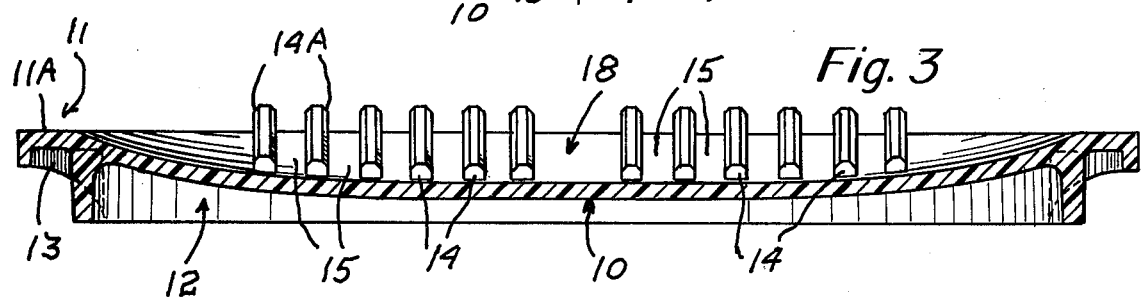
FIG. 3 is a section, on an increase in scale, taken approximately along the indicated line 3—3 of FIG. 2.
Figure 4:
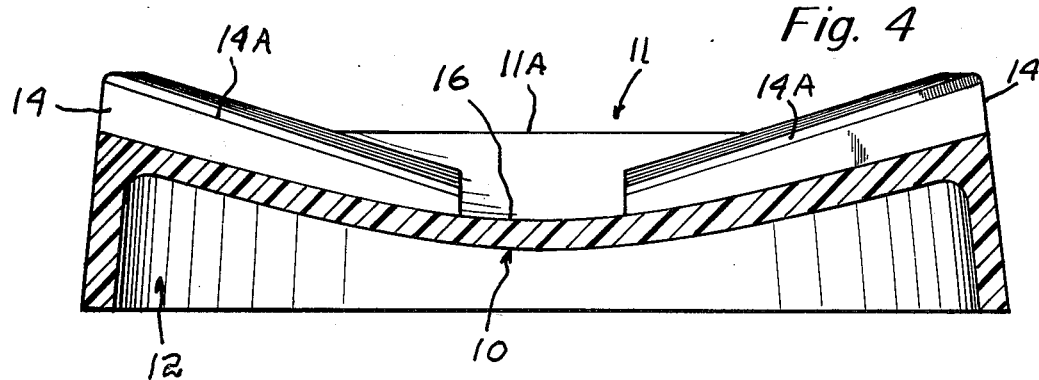
FIG. 4 is a section, on a further increase in scale, taken approximately along the indicated lin 4—4 of FIG. 2.

The tray illustrated by the drawings includes a substantially ovate, concavo-convex, central portion, generally indicated at 10 and having planar margins with a handle generally indicated at 11 at each end of the portion 10 which is supported by a marginal, planar wall 12 having at least one face thereof inclined upwardly and inwardly.

Each handle 11 has a flat portion 11A the margins of which merge with the margins of the ovate portion 10 and which tapers forwardly and inwardly with its end margins showns as parallel to the short axis thereof. Each handle 11 includes a depending marginal wall 13 to provide a hand grip, the walls 13 of the handles curving downwardly and merging with the walls 12.

The upper surface of the tray portion 10 is provided with a rib structure consisting of first and second series of solid transverse ribs 14 spaced apart to provide channels 15 and with the corresponding ribs of the two series aligned and inwardly and downwardly inclined with their inner ends spaced apart to establish a lengthwise channel 16 and their outer ends exposed above the margins of the tray portion 10. The ribs of the two series provide a V-shaped support for a watermelon, regardless of its length and shown in broken lines in FIG. 1 and generally indicated at 17, the rib structure holding the watermelon against rolling with its long axis over the channel 16. The ribs 14 are preferably marginally bevelled as at 14A.

The ribs 14 are arranged in two groups which are spaced from each other midway between the ends of the tray to provide an area, generally indicated at 18 for the support of a watermelon by an end thereof or of a melon of a type that is more nearly spherical. Each group of ribs is also spaced from the curved ends of the ovate portion 10.

Desirably the tray is molded from a suitable plastic with polyethylene preferred and is twenty inches long with the tray portion itself being eighteen inches in length and eight inches wide, these dimensions by way of example and not of limitation. With the tray wall 12 from one and one-half to two inches in height, watermelons of various sizes can be supported with the tray of adequate strength to enable the tray to be carried with each handle hand held. The ribs of each group may have a saw tooth or similar roughened surface and are in the neighborhood of one-half inch in thickness and space about three inches apart to provide that the channels 15 are of a width that facilitates the cutting of servings of desired thickness and with the rib height such that servings may be cut without the knife cutting into the tray. The lengthwise channel 16 provides the same advantages in cutting the watermelon lengthwise and due to the shape of the tray portion 10 liquids drain from the channels 15 into the central, deepest part of the channel 16.

I claim:

1. A molded plastic holder for use in supporting a watermelon and other melons while being sliced into servings, said holder including an elongated tray and a series of transverse ribs on the upper surface of said tray and spaced lengthwise thereof, said ribs dimensioned to provide an elongated support to hold a melon out of contact with said tray that lengthwise is approximately concave and transversely substantially V-shaped thereby to hold the supported melon against rolling, the space between the ribs and the ribs of a height such that adjacent ribs define transverse channels that the cutting knife may enter as a serving is being cut, the outer ends of said ribs extending to and above the outer edges of the tray.

2. The holder of claim 1 in which the ribs are arranged in two groups spaced from each other centrally of the tray with the proximate ribs of the two groups operable to confine and support a watermelon by an end thereof or confine and support other melons that are more nearly spherical.

3. The holder of claim 1 in which the tray includes a concave, substantially ovate portion and the ribs are arranged in two laterally spaced series with the space between their proximate ends defining a channel extending lengthwise and centrally of the tray to receive juices from a sliced melon and conduct such juice to the central portion of the tray.

4. The holder of claim 3 in which corresponding ribs define an angle less obtuse than the adjacent areas of the tray.

5. The holder of claim 4 in which there is a handle at each end of said portion and each handle includes a depending wall providing a hand grip, said wall curving downwardly towards both sides and said portions and merging with the supporting wall thereof.

6. The holder of claim 4 in which the ribs are solid and the outer ends of the ribs extend above the margins of the ovate portion.

* * * * *